US009549456B2

(12) United States Patent
Roy et al.

(10) Patent No.: US 9,549,456 B2

(45) Date of Patent: Jan. 17, 2017

(54) SOLID STATE HEATING SOURCE AND PLASMA ACTUATORS INCLUDING EXTREME MATERIALS

(75) Inventors: Subrata Roy, Gainesville, FL (US); Ryan Durscher, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 494 days.

(21) Appl. No.: 14/129,239

(22) PCT Filed: Jun. 25, 2012

(86) PCT No.: PCT/US2012/043947

§ 371 (c)(1), (2), (4) Date: Mar. 31, 2014

(87) PCT Pub. No.: WO2012/178147

PCT Pub. Date: Dec. 27, 2012

(65) Prior Publication Data

US 2014/0284325 A1 Sep. 25, 2014

Related U.S. Application Data

(60) Provisional application No. 61/500,967, filed on Jun. 24, 2011.

(51) Int. Cl.

*H05H 1/24* (2006.01)

*B01J 19/08* (2006.01)

(52) U.S. Cl.

CPC .... *H05H 1/2406* (2013.01); *H05H 2001/2412* (2013.01); *H05H 2001/2425* (2013.01)

(58) Field of Classification Search

CPC .................... H05H 1/2406; H05H 2001/2412; H05H 2001/2425

USPC ........... 219/770, 764, 780; 315/326; 445/35; 422/95, 186.04, 186.21; 438/633, 798

See application file for complete search history.

(56) References Cited

U.S. PATENT DOCUMENTS

| | | | |
|---|---|---|---|
| 7,380,756 B1 | 6/2008 | Enloe et al. | |
| 2007/0037383 A1* | 2/2007 | Ahn .................... | H01L 21/7684 438/633 |
| 2007/0053805 A1* | 3/2007 | Kaneko .................. | B01D 53/32 422/186.04 |
| 2010/0127624 A1 | 5/2010 | Roy | |
| 2010/0133386 A1 | 6/2010 | Schwimley et al. | |
| 2011/0048025 A1 | 3/2011 | Ginn et al. | |

OTHER PUBLICATIONS

Enloe, C.L., et al., "Mechanisms and Responses of a Single Dielectric Barrier Plasma Actuator: Geometric Effects," *AIAA Journal*, vol. 42, No. 3, Mar. 2004, pp. 595-604.

(Continued)

*Primary Examiner* — Quang Van

(74) *Attorney, Agent, or Firm* — Saliwanchik, Lloyd & Eisenschenk

(57) ABSTRACT

Solid state flow control devices, solid state heating sources, and plasma actuators are provided. A plasma actuator can include at least one powered electrode separated from at least one grounded electrode by a dielectric material. The dielectric material can be a ferroelectric material or a silica aerogel. Solid state flow control devices and solid state heating sources can include at least one such plasma actuator.

21 Claims, 11 Drawing Sheets

(56) References Cited

OTHER PUBLICATIONS

Enloe, C.L., et al., "Mechanisms and Responses of a Single Dielectric Barrier Plasma Actuator: Plasma Morphology," *AIAA Journal*, vol. 42, No. 3, Mar. 2004, pp. 589-594.
Enloe, C.L., et al., "Parameterization of temporal structure in the single-dielectric-barrier aerodynamic plasma actuator," *AIAA Journal*, vol. 44, No. 6, Jun. 2006, pp. 1127-1136.
Forte, M., et al., "Optimization of a dielectric barrier discharge actuator by stationary and non-stationary measurements of the induced flow velocity: application to flow control," *Experiments in Fluids*, vol. 43, No. 6, Dec. 2007, pp. 917-928.
He, C., et al., "Plasma Flaps and Slats: An Application of Weakly Ionized Plasma Actuators," *Journal of Aircraft* , vol. 46, No. 3, May-Jun. 2009, pp. 864-873.
Hoskinson, A.R., et al., "Force measurements of single and double barrier DBD plasma actuators in quiescent air," *Journal of Physics D: Applied Physics*, vol. 41, No. 24, Dec. 2008, Article No. 245209.
Hrubesh, L.W., et al., "Dielectric properties of aerogels", *Journal of Materials Research*, vol. 8, No. 7, Jul. 1993, pp. 1736-1741.
Huang, J., et al., "Plasma Actuators for Separation Control of Low-Pressure Turbine Blades," *AIAA Journal*, vol. 44, No. 1, Jan. 2006, pp. 51-57.
Moreau, E., "Airflow control by non-thermal plasma actuators," *Journal of Physics D: Applied Physics*, vol. 40, No. 3, Feb. 2007, pp. 605-636.
Post, M., et al., "Separation Control Using Plasma Actuators: Dynamic Stall Vortex Control on Oscillating Airfoil," *AIAA Journal*, vol. 44, No. 12, Dec. 2006, pp. 3125-3135.
Rizzetta, D.P., et al., "Plasma-Based Flow-Control Strategies for Transitional Highly Loaded Low-Pressure Turbines," *J. Fluids Eng.*, vol. 130, Issue 4, 2008.
Roth, J.R, et al., "Boundary layer flow control with one atmosphere uniform glow discharge surface plasma," $36^{th}$ AIAA Aerospace Science Meeting, Reno, NV, 1998, AIAA Paper No. 1998-0328.
Roth, J.R., et al., "Electrohydrodynamic flow control with a glow-discharge surface plasma," *AIAA Journal*, vol. 38, No. 7, Jul. 2000, pp. 1166-1172.
Sung, Y., et al., "Aerodynamic Modification of Flow over Bluff Objects by Plasma Actuation," Experiments in Fluids, vol. 41, No. 3, Sep. 2006, pp. 479-486.
Thomas, F.O., et al., "Optimization of Dielectric Barrier Discharge Plasma Actuators for Active Aerodynamic Flow Control," *AIAA Journal*, vol. 47, No. 9, Sep. 2009, pp. 2169-2177.
TSI Incorporated, "Moderl 9302 Atomizer Instruction Manual," St. Paul, MN, Sep. 2000.

* cited by examiner

FIG. 6A
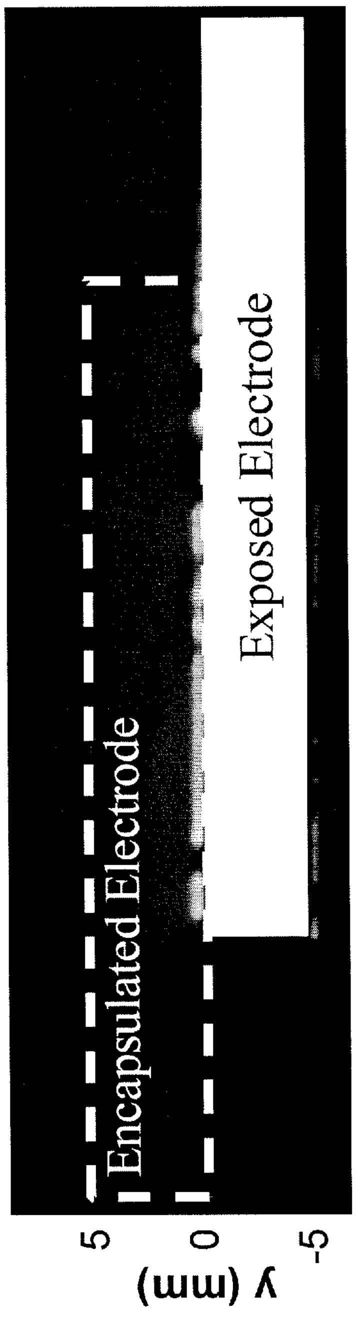
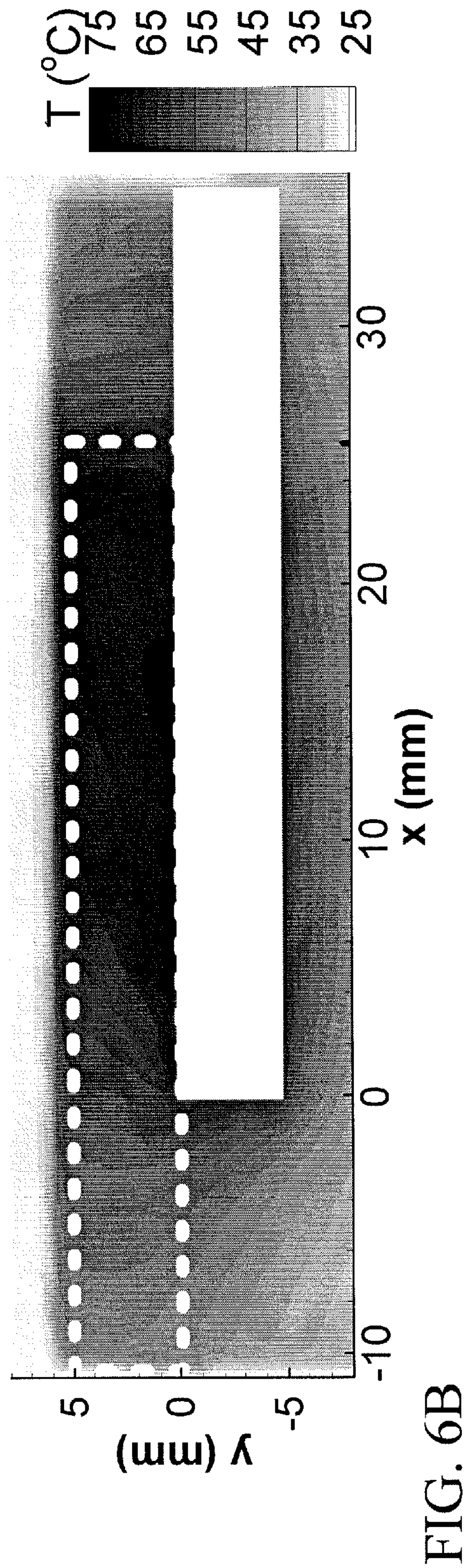
FIG. 6B

Serpentine

Square

Linear

Triangular

SOLID STATE HEATING SOURCE AND PLASMA ACTUATORS INCLUDING EXTREME MATERIALS

CROSS-REFERENCE TO RELATED APPLICATIONS

This application is the U.S. National Stage Application of International Patent Application No. PCT/US2012/043947, filed on Jun. 25, 2012, which claims the benefit of U.S. Provisional Patent Application Ser. No. 61/500,967, filed Jun. 24, 2011, the disclosures of both of which are hereby incorporated by reference in their entirety, including any figures, tables, or drawings.

BACKGROUND OF INVENTION

Solid state flow control devices are in high demand for moderate to high flow speeds. Such devices can have several important applications. Current solid state flow control devices operate using arc filament and/or arc heating flow control methods. These methods require a high amount of energy and lead to high manufacturing costs.

BRIEF SUMMARY

Embodiments of the subject invention relate to solid state flow control devices, methods of manufacturing the same, and methods of using the same. A solid state flow control device can include a set of electrodes separated by a dielectric material.

Embodiments of the subject invention also to solid state heating sources, methods of manufacturing the same, and methods of using the same. A solid state heating source can include a set of electrodes separated by a dielectric material.

Embodiments of the subject invention also relate to plasma actuators, methods of manufacturing the same, and methods of using the same. A plasma actuator can include a set of electrodes separated by a dielectric material.

In an embodiment, a plasma actuator can include: a dielectric material; at least one powered electrode in contact with the dielectric material; and at least one grounded electrode in contact with the dielectric material. The at least one powered electrode and the at least one grounded electrode can be electrically separated from each other by the dielectric material, and the dielectric material can be a ferroelectric material. A solid state flow control device or a solid state heating source can include such a plasma actuator.

In another embodiment, a method of fabricating a plasma actuator can include: forming at least one ground electrode; forming a dielectric material; and forming at least one power electrode. The at least one ground electrode and the at least one power electrode can be electrically separated from each other by the dielectric material, and the dielectric material can be a ferroelectric material.

In another embodiment, a method of generating heat can include: providing a plasma actuator including at least one powered electrode in contact with a dielectric material and at least one grounded electrode in contact with the dielectric material; and applying a voltage potential, with respect to the at least one grounded electrode, to the at least one powered electrode. The at least one powered electrode and the at least one grounded electrode can be electrically separated from each other by the dielectric material, and the dielectric material can be a ferroelectric material.

In another embodiment, a plasma actuator can include: a dielectric material; at least one powered electrode in contact with the dielectric material; and at least one grounded electrode in contact with the dielectric material. The at least one powered electrode and the at least one grounded electrode can be electrically separated from each other by the dielectric material, and the dielectric material can be a silica aerogel. A solid state flow control device or a solid state heating source can include such a plasma actuator.

In another embodiment, a method of fabricating a plasma actuator can include: forming at least one ground electrode; forming a dielectric material; and forming at least one power electrode. The at least one ground electrode and the at least one power electrode can be electrically separated from each other by the dielectric material, and the dielectric material can be a silica aerogel.

In another embodiment, a method of generating heat can include: providing a plasma actuator including at least one powered electrode in contact with a dielectric material and at least one grounded electrode in contact with the dielectric material; and applying a voltage potential, with respect to the at least one grounded electrode, to the at least one powered electrode. The at least one powered electrode and the at least one grounded electrode can be electrically separated from each other by the dielectric material, and the dielectric material can be a silica aerogel.

BRIEF DESCRIPTION OF DRAWINGS

This patent or application file contains at least one drawing executed in color. Copies of this patent or patent application publication with color drawing(s) will be provided by the Office upon request and payment of the necessary fee.

FIGS. 6A and 6B show instantaneous temperature distributions over a plasma actuator according to an embodiment of the present invention.

DETAILED DISCLOSURE

Figure 1:
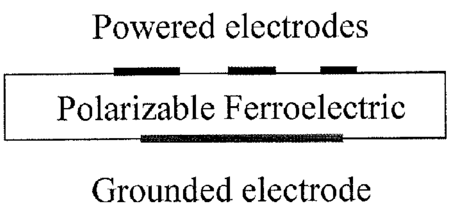
FIG. 1 shows a schematic of a plasma actuator according to an embodiment of the present invention.

When the terms "on" or "over" are used herein, when referring to layers, regions, patterns, or structures, it is understood that the layer, region, pattern or structure can be directly on another layer or structure, or intervening layers, regions, patterns, or structures may also be present. When the terms "under" or "below" are used herein, when referring to layers, regions, patterns, or structures, it is understood that the layer, region, pattern or structure can be directly under the other layer or structure, or intervening layers, regions, patterns, or structures may also be present. When the term "directly on" is used herein, when referring to layers, regions, patterns, or structures, it is understood that the layer, region, pattern or structure is directly on another layer or structure, such that no intervening layers, regions, patterns, or structures are present.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

Embodiments of the subject invention relate to solid state flow control devices, methods of manufacturing the same, and methods of using the same. A solid state flow control device can include a set of electrodes separated by a dielectric material.

Embodiments of the subject invention also to solid state heating sources, methods of manufacturing the same, and methods of using the same. A solid state heating source can include a set of electrodes separated by a dielectric material.

Embodiments of the subject invention also relate to plasma actuators, methods of manufacturing the same, and methods of using the same. A plasma actuator can include a set of electrodes separated by a dielectric material.

Solid state flow control devices and heating sources according to embodiments of the subject invention can use an electrically-driven plasma source (e.g., a plasma actuator) such that the heat generation can be strongly dependent upon the frequency of an applied electric potential. This can provide a low-cost alternative to are filament and are heating flow control methods due to decreased energy budget and decreased manufacturing costs.

In embodiments of the present invention, a solid state flow control device or solid state heating source can include at least one plasma actuator. Each plasma actuator can include a set of electrodes separated by a dielectric material. In an embodiment, at least one of the electrodes can be grounded. The remaining one or more electrodes can be configured to have a voltage applied, and the voltage can be either direct current (DC) or alternating current (AC). The plasma actuator can incorporate, or be configured to connect to, a power source. At least one electrode of the plasma actuator can be connected to, or configured to connect to, the power source. In an embodiment, the voltage applied, with respect to the grounded electrode(s), across each of the non-grounded electrodes can be the same. In an alternative embodiment, the voltage applied, with respect to the grounded electrode(s), across the non-grounded electrodes can vary.

In many embodiments, one or more non-grounded electrodes can be separated from one or more grounded electrodes by a dielectric material. The dielectric material can be a material with high permittivity, though embodiments are not limited thereto. The vacuum (air) permittivity ($\epsilon_0$) is $8.85\times10^{-12}$ Farad/meter. The relative permittivity (also referred to as the dielectric constant) of a material is the permittivity of the material divided by the vacuum permittivity. Materials with high relative permittivity (e.g., >10) become highly polarizable and hence exhibit a phenomenon referred to as spontaneous electron emission. The particles spin under alternating electric field and rapidly generate heat as a function of the applied frequency. Such a material is good for polarization heating of a surface (not Joule heating) even at low voltages (e.g., 100 s of V). Materials with low relative permittivity (e.g., <2) transfer energy very efficiently with minimal dielectric heating loss. A very high voltage (for example, based on thickness, 60 kV across a 6 mm thick silica aerogel) with minimal to no damage to the material. This can advantageously induce high thrust per weight of the actuator material.

In an embodiment, a plasma actuator can include a dielectric material that has a dielectric constant of at least 10 or greater than 10. For example, the dielectric material can have a dielectric constant of at least 100, at least 1,000, or at least 10,000. In a specific embodiment, the dielectric material is in the range of slightly above 1 (free space) to 15,000, 1.001 to 15,000, 1.01 to 15,000, 1.1 to 15,000, 10 to 15,000, 100 to 15,000, 1000 to 15,000, 10,000 to 15,000, 10 to 100, 10 to 1000, 10 to 10,000, 100 to 1000, 100 to 10,000, 1000 to 10,000, 10 to 15,000, 100 to 15,000, 1000 to 15,000, or greater than 15,000. In an alternative embodiment, a plasma actuator can include a dielectric material that has a dielectric constant of no more than 2 or less than 2.

The dielectric material can be, for example, a ferroelectric material, hafnium oxide, an aerogel, a silica aerogel, an organic aerogel (e.g., Resorcinol-Formaldehyde), a metal oxide based aerogel, or a carbon aerogel. In an embodiment, the dielectric material can be a ferroelectric material. Examples of ferroelectric materials that can be as the dielectric material with respect to embodiments of the invention include, but are not limited to, Lead Zirconate Titanate (PZT), Barium Titanate (BT), Lead Titanate (PT), Lead Lanthanum Zirconate Titanate (PLZT), Lead Magnesium Niobate (PMN). In a further embodiment, the dielectric material can be a very high permittivity ferroelectric material. In a further embodiment, the dielectric material can be a silica aerogel. Numerous open sources online may be found that describe the material properties of silica aerogel, as well as how to make these materials. Silica aerogels in general consist or a complex microstructure of silicon dioxide in which air occupies a majority of the volume. In a further embodiment, the dielectric material can be an acrylic material. In a further embodiment, the dielectric material can be Kapton.

The dielectric material can have any reasonable thickness separating the electrodes. In an embodiment the thickness of the dielectric material (and the distance by which at least one grounded electrode is separated from at least one powered electrode) can be any internal range within the endpoints of 0.01 mm and 15 mm. In an embodiment, the thickness of the dielectric material can be in a range of from 0.1 mm to 10 mm. In a further embodiment, the thickness of the dielectric material can be in a range of from 0.15 mm to 8 mm. In a further embodiment, the thickness of the dielectric material can be in a range of from 0.17 mm to 6 mm. For example, the thickness of the dielectric material can be 0.17 mm, 1.5 mm, 3.0 mm, 4.6 mm, or 6.0 mm.

In an embodiment, a powered electrode can be aligned with a grounded electrode in at least one direction. In a further embodiment, a powered electrode can be non-aligned with a grounded electrode in at least one direction. In a further embodiment, a powered electrode can be aligned with a grounded electrode in at least one direction and can be non-aligned with a grounded electrode in at least one direction.

Referring to FIG. 1, in an embodiment, a plasma actuator can include at least one grounded electrode separated from at least one powered electrode by a dielectric material. The dielectric material can be a polarizable ferroelectric material, though embodiments are not limited thereto. The one or more powered electrodes can either be electrically connected to one or more power sources or configured to be electrically connected to one or more power sources. A small plasma discharge can be generated in the vicinity of a powered electrode to induce an electrohydrodynamic (EHD) body force, which can generate heat and/or a force. Though FIG. 1 shows three powered electrodes and one grounded electrode, embodiments are not limited thereto.

In an embodiment, the voltage potential applied to one or more powered electrodes, with respect to one or more grounded electrodes, can be an AC signal. The frequency of an applied signal can be any reasonable frequency. In an embodiment, the frequency of an applied signal can be any internal range within the endpoints of 0.1 kHz and 15 GHz. For example, the frequency of an applied signal can be in a range of from 0.1 kHz to 1 GHz. In an embodiment, the frequency of an applied signal can be in a range of from 0.1 kHz to 10 MHz. In a further embodiment, the frequency of an applied signal can be in a range of from 0.1 MHz to 10 MHz. In a further embodiment, the frequency of an applied signal can be in a range of from 0.1 kHz to 20 kHz. For example, the frequency of an applied signal can be 0.1 kHz, 0.5, kHz, 1 kHz, 5 kHz, 14 kHz, or 15 kHz.

The amplitude of an applied signal can be any reasonable amplitude. In an embodiment, the amplitude of an applied signal can be any internal range within the endpoints of 0 V peak-to-peak (pp) and 200 kVpp. For example, the amplitude can be in a range of from 1.5 kVpp to 150 kVpp. In an embodiment, the amplitude can be in a range of from 1.5 kVpp to 36 kVpp. In a further embodiment, the amplitude can be in a range of from 1.5 kVpp to 30 kVpp. For example, the amplitude of an applied signal can be 1.5 kVpp, 2.5 kVpp, 3.0 kVpp, 3.5 kVpp, or 4.0 kVpp. The amplitude of an applied signal can also be expressed as a ratio of the thickness of the dielectric material. In an embodiment, the amplitude of an applied signal can be any internal range within the endpoints of 0 Vpp/cm of thickness of the dielectric material and 300 kVpp/cm. In an embodiment, the amplitude can be in a range of from 20 kVpp/cm to 60 kVpp/cm.

In an embodiment, the voltage potential applied to one or more powered electrodes, with respect to one or more grounded electrodes, can be applied in a duty cycle. A duty cycle can advantageously minimize the power requirement. In each cycle of the duty cycle, the voltage potential can be applied for one or more portions of the cycle and not applied for the other portions of the cycle. For example, the voltage potential can be applied as a repeating cycle of one or more pulses. The duration of the one or more portions of the cycle in which the voltage potential is applied can be any internal range within the endpoints of 10% of the duration of the cycle to 90% of the duration of the cycle. For example, the duration of the one or more portions of the cycle in which the voltage potential is applied can be from 20% of the duration of the cycle to 50% of the duration of the cycle. In an embodiment, the duration of the one or more portions of the cycle in which the voltage potential is applied can be about 25% of the duration of the cycle. In a particular embodiment, a 5 kHz, 10 kV (peak-to-peak) voltage potential can be applied in a pulsing duty cycle in which the duration of the one or more portions of the cycle the voltage potential is applied is about 25% of the duration of the cycle.

In an embodiment, at least one electrode of a plasma actuator can be encapsulated by a material, for example, by the dielectric material, a separate dielectric material, an epoxy material, and/or electrical tape. At least one electrode can be exposed to the environment. In certain embodiments, the encapsulated electrode(s) can be grounded, and the exposed electrode(s) can be powered.

Figure 2:
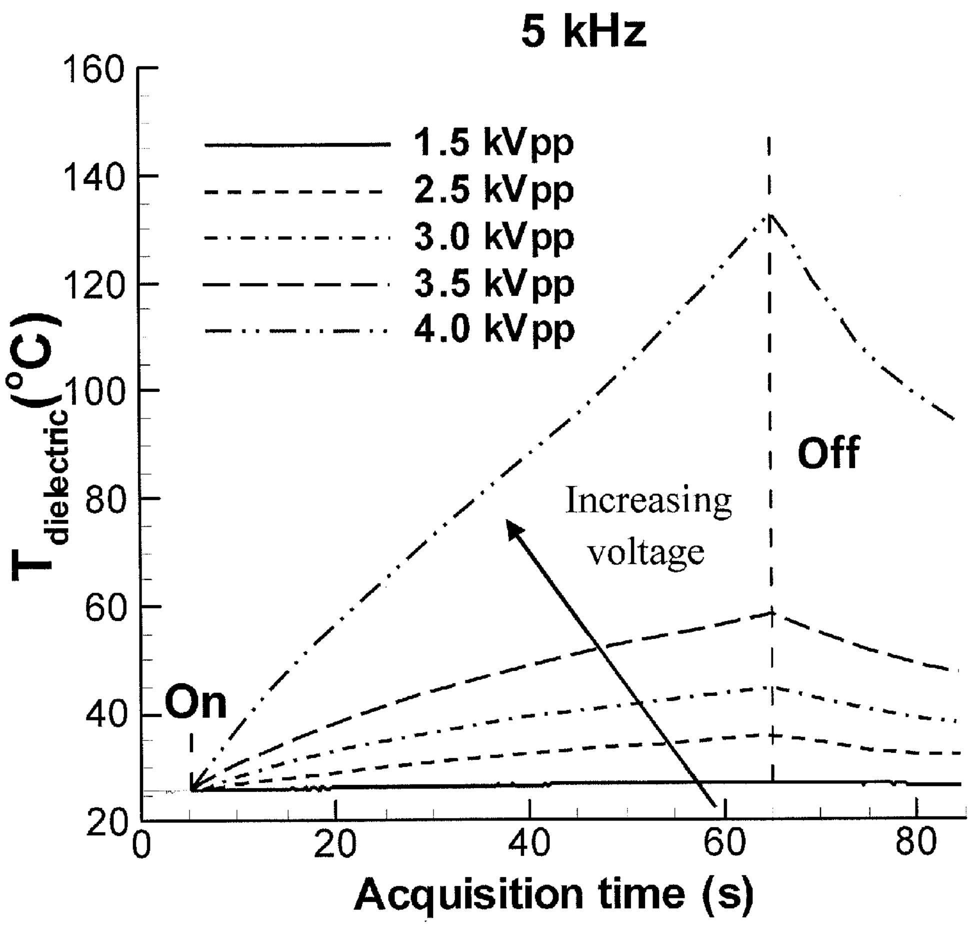
FIG. 2 shows a plot of temperature as a function of time at different applied voltages for a plasma actuator according to an embodiment of the present invention.

FIG. 2 shows a plot of the dielectric temperature vs. acquisition time for a plasma actuator according to an embodiment of the subject invention. The solid state flow control device includes a plasma actuator having a grounded electrode separated from a powered electrode by a polarizable ferroelectric dielectric material. The device was turned on at the 5-second mark and turned off at the 65-second mark. The plot shows curves for five different signals: 1.5 kVpp, 2.5 kVpp, 3.0 kVpp, 3.5 kVpp, and 4.0 kVpp (from bottom to top at the 65-second mark). Each signal had a frequency of 5 kHz. The temperature increased with increasing peak-to-peak voltage, with the 4.0 kVpp signal showing a temperature of about 60° C. at the 65-second mark, after 60 seconds of being on. The ambient temperature was about 27° C.

Figure 3:
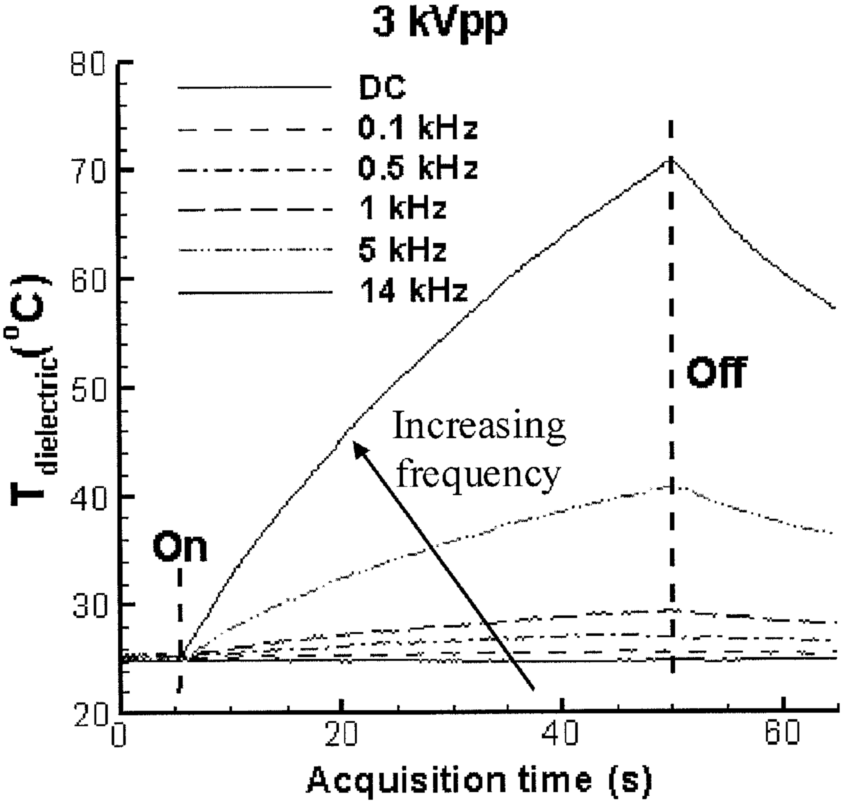
FIG. 3 shows a plot of temperature as a function of time at different frequencies for a plasma actuator according to an embodiment of the present invention.

FIG. 3 shows a plot of the dielectric temperature vs. acquisition time for a plasma actuator according to an embodiment of the subject invention. The solid state flow control device includes a plasma actuator having a grounded electrode separated from a powered electrode by a polarizable ferroelectric dielectric material. The device was turned on at the 5-second mark and turned off at the 50-second mark. The plot shows curves for five different signals: DC, 0.1 kHz, 0.5 kHz, 1 kHz, 5 kHz, and 14 kHz (from bottom to top at the 50-second mark). Each signal had an amplitude of 3 kVpp. The temperature increased with increasing frequency, with the 14 kHz signal showing a temperature of about 70° C. at the 50-second mark, after 45 seconds of being on. The ambient temperature was about 27° C.

Figure 4:
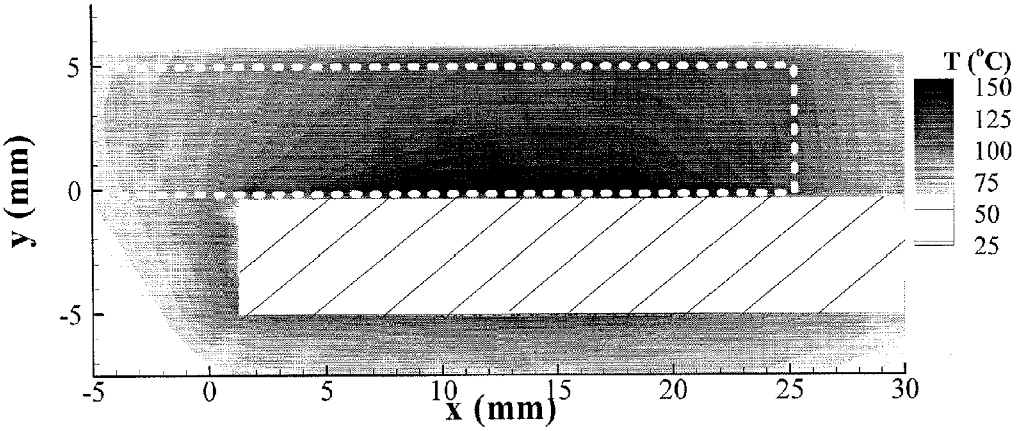
FIG. 4 shows an instantaneous temperature distribution over a plasma actuator according to an embodiment of the present invention.

FIG. 4 shows an instantaneous distribution of temperature for a solid state flow control device according to an embodiment of the subject invention. The solid state flow control device includes a plasma actuator having a grounded electrode separated from a powered electrode by a polarizable ferroelectric dielectric material.

Figure 5:
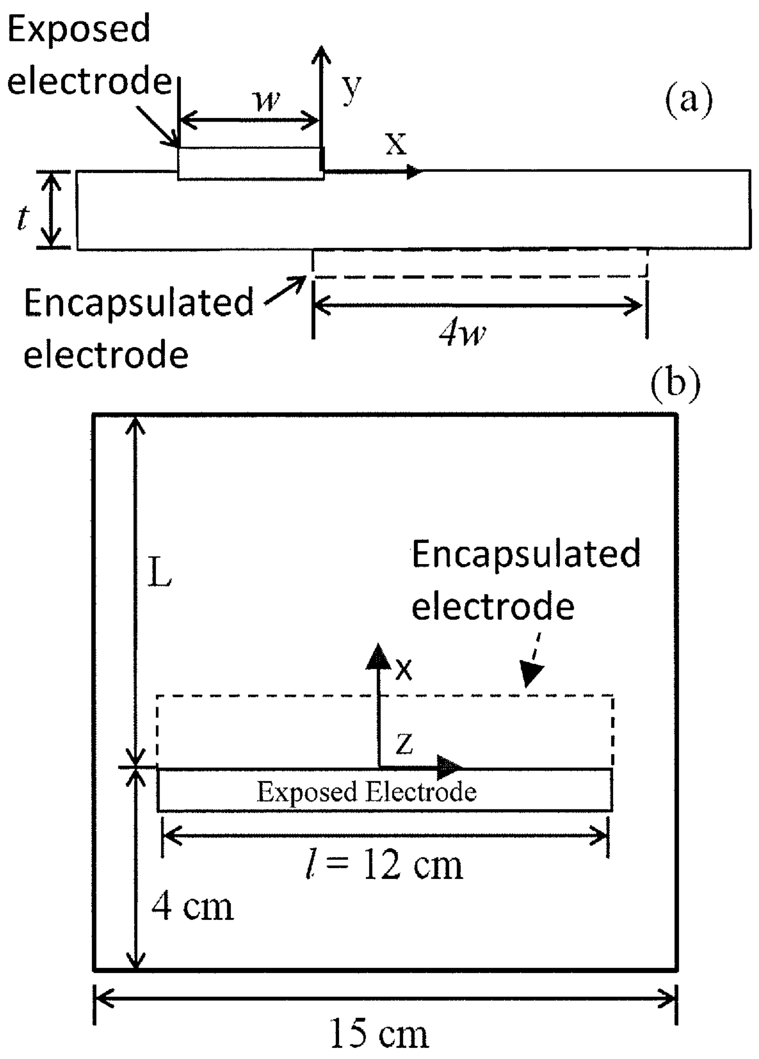
FIGS. 5A and 5B show a schematic of a plasma actuator according to an embodiment of the present invention, with FIG. 5A showing a side view and FIG. 5B showing a top view.

FIG. 5 shows a schematic of a plasma actuator according to an embodiment of the present invention. The actuator can include two electrodes, one placed on either side of a dielectric material. The electrodes can be, for example, copper electrodes, though embodiments are not limited thereto. One electrode can be encapsulated in a material, for example, the dielectric material, an epoxy material, and/or standard electrical tape. The other electrode can be exposed. The two electrodes can have little to no horizontal (z-direction in FIG. 5B) displacement between them.

Each electrode can be made from any suitable material known in the art. For example, each electrode can include one or more of the following materials: copper, aluminum, gold, silver, platinum, indium tin oxide, indium zinc oxide, aluminum tin oxide, aluminum zinc oxide, calcium, magnesium, carbon nanotubes, silver nanowire, LiF/Al/ITO, Ag/ITO, and $CsCO_3$/ITO.

Figure 11A:
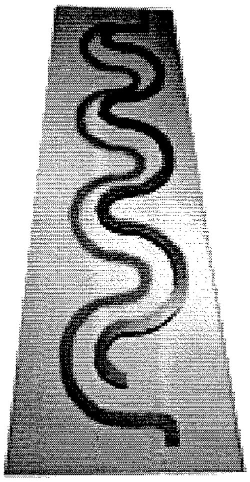
FIGS. 11A-11D show examples of configurations for electrode sets for plasma actuators according to embodiments of the present invention.
Figure 11B:
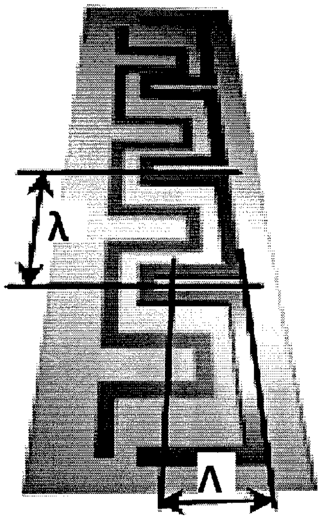
Figure 11C:
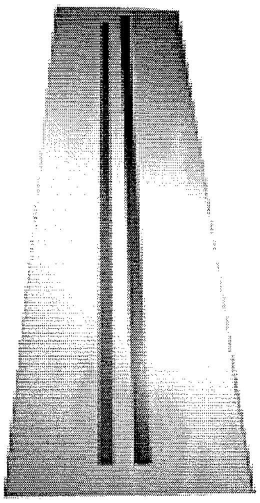
Figure 11D:
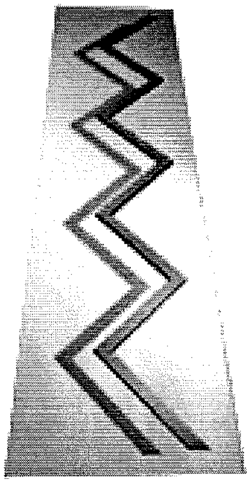

The electrode set for a plasma actuator can have any reasonable configuration. In various embodiments, a plasma actuator can include an electrode set having a linear, triangular, square, rectangular, serpentine, circular, oval, or other curved or polygonal shape. FIGS. 11A-11D show examples of shapes that an electrode set of a plasma actuator can have according to embodiments of the subject invention. FIG. 11A shows a serpentine shape; FIG. 11 B shows a square (rectangular) shape; FIG. 11C shows a linear shape; and FIG. 11D shows a triangular shape. FIGS. 11A-11D are presented as examples only and should not be construed as limiting.

In an embodiment, a method of fabricating a plasma actuator can include: forming at least one ground electrode; forming a dielectric material; and forming at least one power electrode. The at least one ground electrode and the at least one power electrode can be electrically separated from each other by the dielectric material, and the dielectric material can be a ferroelectric material. Each power electrode can be configured to connect to a power source and/or can be connected to a power source.

In an embodiment, a method of generating heat can include: providing a plasma actuator including at least one powered electrode in contact with a dielectric material and at least one grounded electrode in contact with the dielectric material; and applying a voltage potential, with respect to the at least one grounded electrode, to the at least one powered electrode. The at least one powered electrode and the at least one grounded electrode can be electrically separated from each other by the dielectric material, and the dielectric material can be a ferroelectric material.

In an embodiment, a method of fabricating a plasma actuator can include: forming at least one ground electrode; forming a dielectric material; and forming at least one power electrode. The at least one ground electrode and the at least one power electrode can be electrically separated from each other by the dielectric material, and the dielectric material can be a silica aerogel. Each power electrode can be configured to connect to a power source and/or can be connected to a power source.

In an embodiment, a method of generating heat can include: providing a plasma actuator including at least one powered electrode in contact with a dielectric material and at least one grounded electrode in contact with the dielectric material; and applying a voltage potential, with respect to the at least one grounded electrode, to the at least one powered electrode. The at least one powered electrode and the at least one grounded electrode can be electrically separated from each other by the dielectric material, and the dielectric material can be a silica aerogel.

Following are examples that illustrate procedures for practicing the invention. These examples should not be construed as limiting.

Example 1

Referring to FIG. 5, two thin (70 μm) copper electrodes were placed asymmetrically on either side of a dielectric material with no horizontal displacement between the two electrodes. The dielectric was a 3 mm thick (t) sheet of acrylic which had a nominal relative dielectric constant of 3. The width, w, of the upper electrode was 0.5 cm while the lower electrode's width was 2 cm. Both electrodes had a length, l, of 12 cm. Standard electrical tape in combination with epoxy covered the encapsulated electrode to avert an unwanted discharge on the lower surface. Similarly, an 84 μm-thick piece of Kapton was placed on the backside of the exposed electrode. The dimensions of the dielectric are shown in FIG. 5B, 15 cm×(4+L) cm, where L was varied.

Example 2

Two thin (70 μm) copper electrodes were placed asymmetrically on either side of a dielectric material with no horizontal displacement between the two electrodes. The dielectric was a 3 mm thick (t) sheet of ferroelectric material which had a nominal relative dielectric constant of 1750. The dimensions of ferroelectric sample were 40×12 (x, y) mm. The exposed and encapsulated electrodes were each 5 mm wide and the thickness of the material was 3 mm. Both electrodes had a length, l, of 12 cm. Standard electrical tape in combination with epoxy covered the encapsulated electrode to avert an unwanted discharge on the lower surface. Similarly, an 84 μm-thick piece of Kapton was placed on the backside of the exposed electrode. A high voltage amplifier (Trek 30/20C) was used.

The ferroelectric material advantageously allowed for the ignition of discharge at a much lower input voltage compared to materials of the same thickness with lower dielectric constants. FIG. 6 shows a temperature distribution profile for this plasma actuator for a 3.5 kVpp, 5 kHz sinusoidal input. The temperature was measured after 300 seconds of operation. Referring to FIG. 6, the discharge is concentrated around the edges of the electrode and does not propagate downstream as would a device constructed from a lower dielectric constant.

Attempts were made to apply higher voltages to the actuator, however dielectric heating became an issue with temperatures reaching ~300° C. after only 10's of seconds of operation. Since the thrust produced is directly tied to voltage, over the range of tested inputs (1.5 to 4.0 kVpp at 5 kHz), no significant force was measured.

Figure 7A:
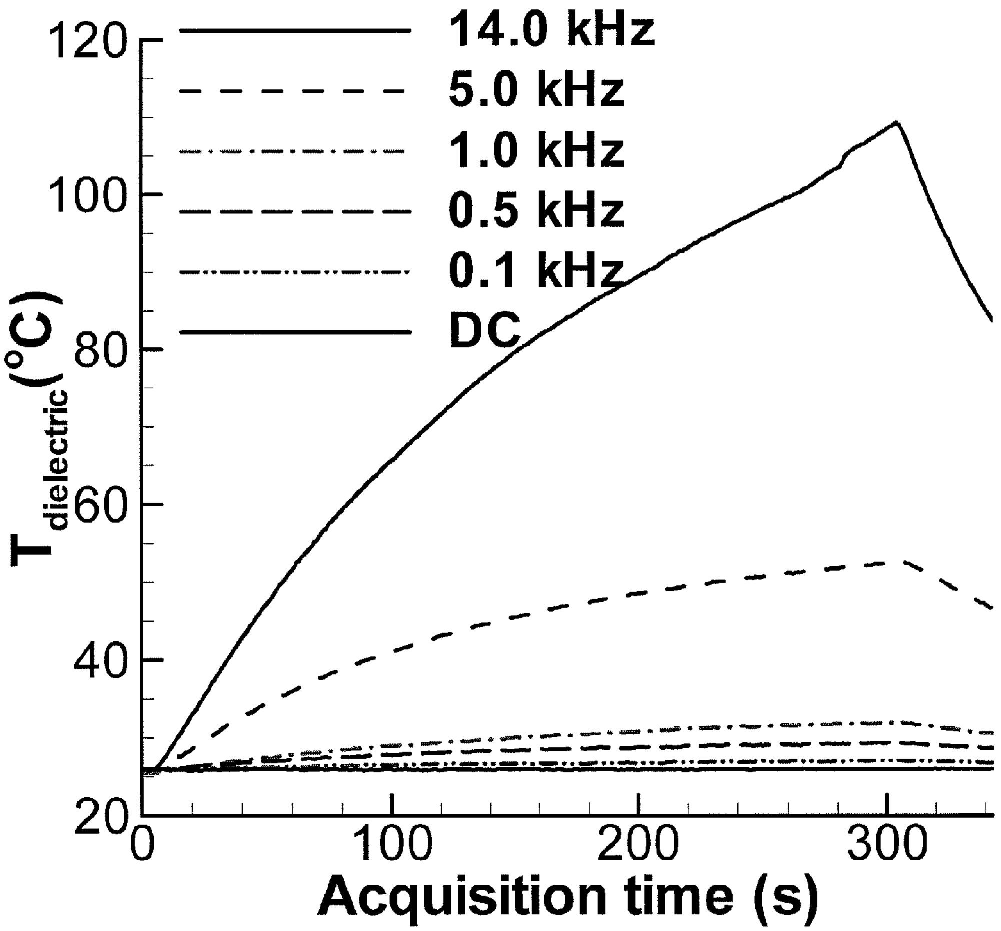
FIG. 7A shows a plot of temperature as a function of time at different frequencies for a plasma actuator according to an embodiment of the present invention.
Figure 7B:
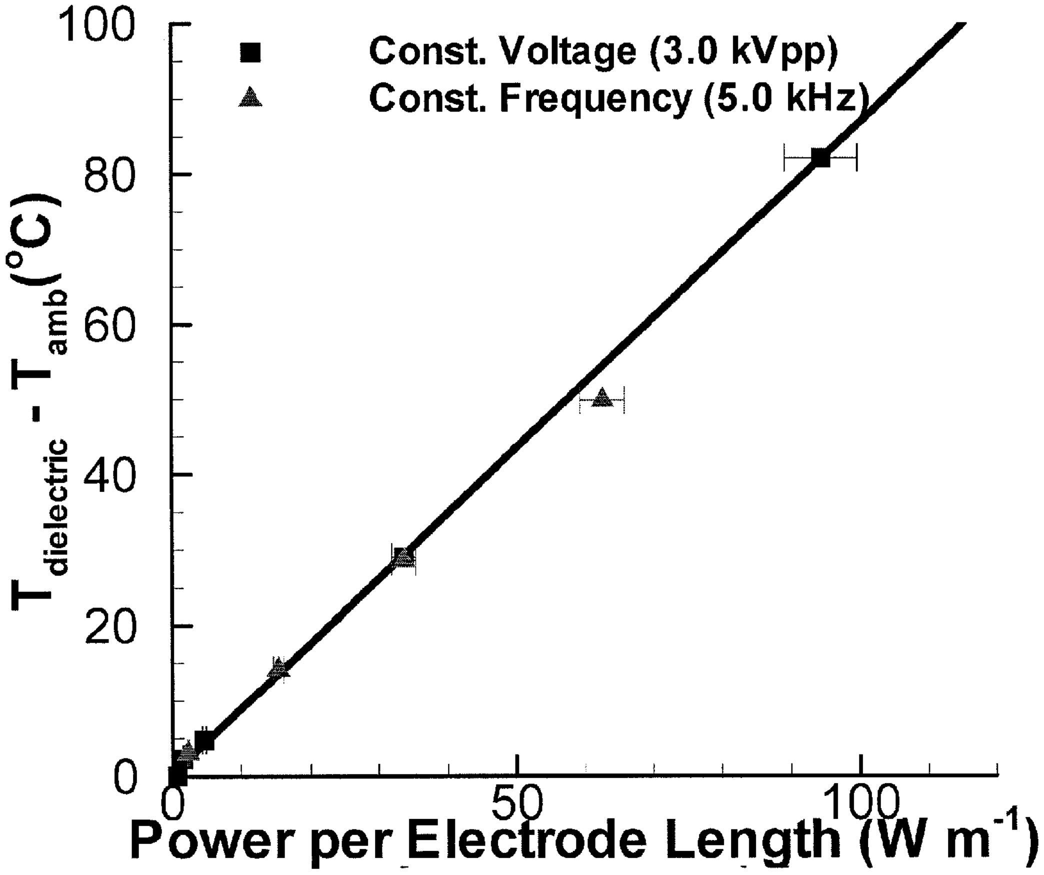
FIG. 7B shows a plot of temperature as a function of power for a plasma actuator according to an embodiment of the present invention.

With no force being achieved, the dielectric heating of the device was investigated. A Flir A320 infrared camera was used. The camera has a spectral range of 7.5-13 μm and pixel resolution of 320×240 pixels. The ambient humidity (55% RH), distance from actuator (0.33 m), and material emissivity were all considered in determining the surface temperature. The ferroelectric's emissivity was found to be 0.96±0.02 and was determined by heating the dielectric to a uniform temperature and comparing the cameras readout with a surface mounted thermocouple. Temperature measurements were made over a range of voltages (1.5 to 4.0 kVpp) at 5.0 kHz as well as over a range of frequencies (DC to 14 kHz) at 3.5 kVpp. FIG. 7A shows a plot of the dielectric temperature vs. acquisition time for the signals having different frequencies. The time traces in FIG. 7A were taken at a point located on the actuator at x=12.5 mm and y=1.5 mm. The surface temperature has a sharp initial increase and then gradually rises to its steady stale temperature. The measurements shown in FIG. 7A correspond to an initial 5 seconds of non-actuation after which the device was turned on for 300 seconds. Once turned off, another 40 seconds of data acquisition continued. The plot shows curves for five different signals: DC, 0.1 kHz, 0.5 kHz, 1 kHz, 5 kHz, and 14 kHz (from bottom to top at the 300-second mark). The temperature increased with increasing frequency, with the 14 kHz signal showing a temperature of about 110° C. at the 300-second mark Noting the seemingly strong dependence on frequency, a plot of the temperature rise after 300 seconds (x=12.5 mm, y=1.5 mm) as a function of power shows a linear relationship proportional to 0.87° C. (FIG. 7B). This proportionality is independent of input frequency or voltage. In FIG. 7B, the green diamonds are for constant frequency measurements (5 kHz), and the red squares are for constant amplitude measurements (3.0 kVpp).

Example 3

Figure 8A:
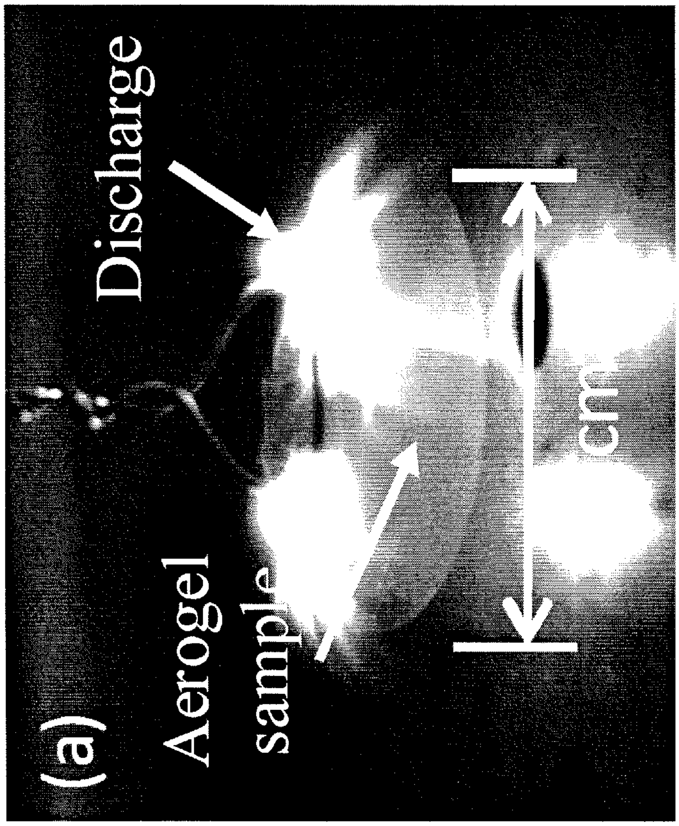
FIGS. 8A and 8B show (A) plasma discharge on a plasma actuator according to an embodiment of the present invention, and (B) a sample of aerogel used as a dielectric material in a plasma actuator according to an embodiment of the present invention.
Figure 8B:
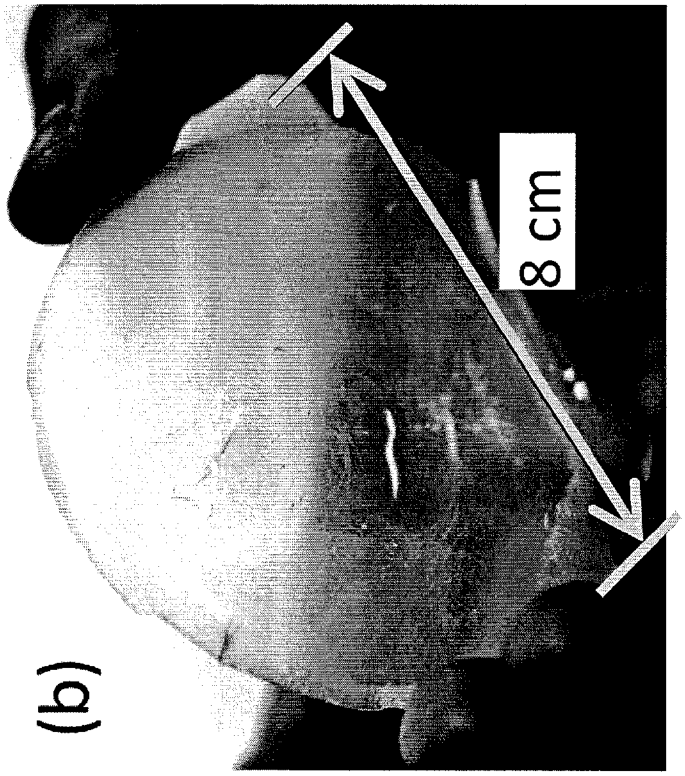

Silica aerogel, having an extremely low dielectric constant, was used as a dielectric material. Silica aerogels in general consist of a complex microstructure of silicon dioxide in which air occupies a majority of it volume. For the samples tested, ~95% of the dielectric's volume was air resulting a density ranging from 0.04 to 0.12 g $cm^{-3}$ with results being reported for samples closer to the lower bounds. Although not measured experimentally, silica aerogels for this range of densities have a dielectric constant of ~1.1. FIG. 8A shows plasma being generated on an initial sample of silica aerogel. FIG. 8B shows a photograph of a sample of silica aerogel for which results are reported. The initial samples tested were relatively small which prohibited the use of the same electrode arrangement as in Example 1. Larger samples (t=6 mm) shown in FIG. 8B were later obtained and the electrode layout shown in FIG. 5A was used for the reported data. However, the length of the electrode, l, was reduced to 4.0 cm.

Figure 9:
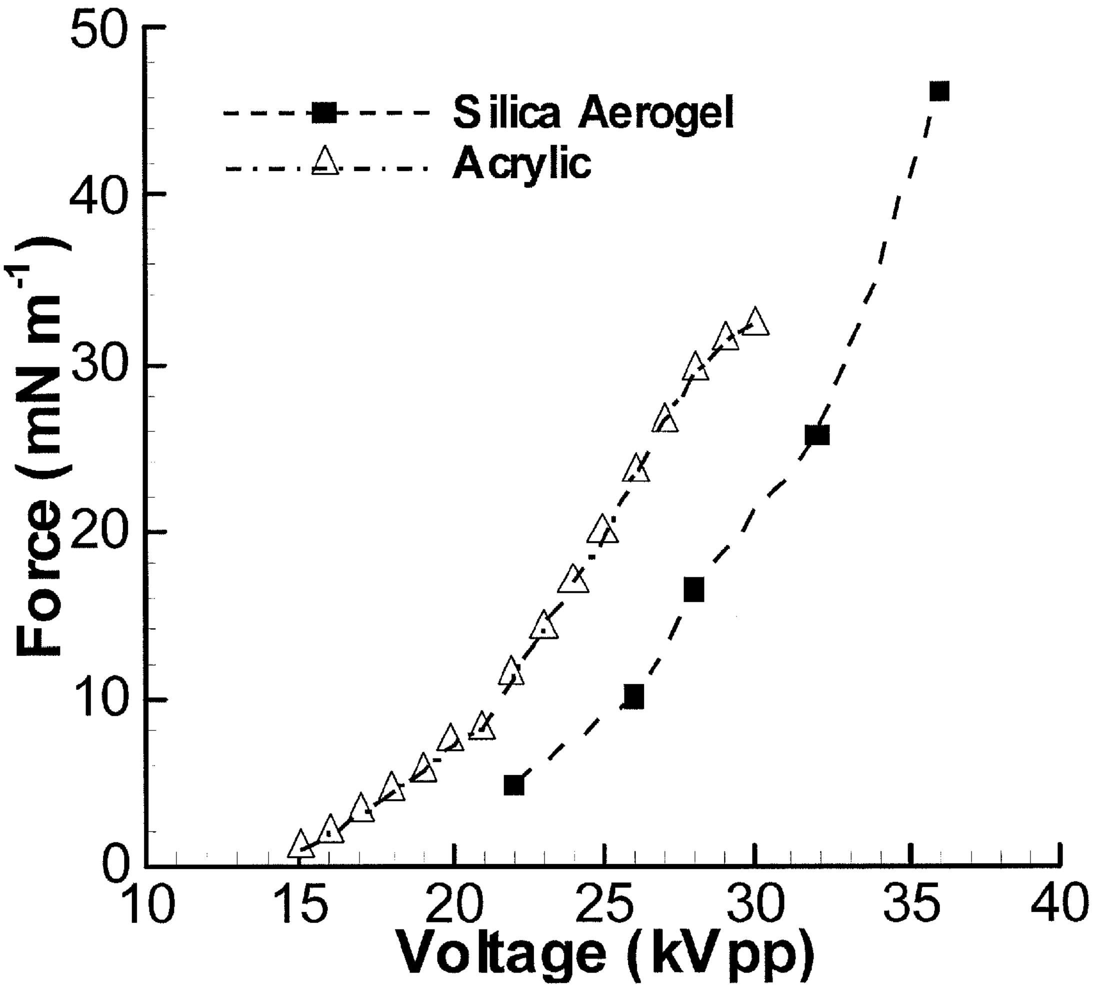
FIG. 9 shows a plot of force as a function of applied voltage for plasma actuators according to embodiments of the present invention.

FIG. 9 shows a plot of force generated vs. voltage applied for two plasma actuators (one with silica aerogel as the dielectric material and the other with an acrylic material as the dielectric material). The thrust produced in the silica aerogel case is extracted from particle image velocimetry (PIV) measurements. The force was found to asymptote for a control volume width of 40 mm. The driving frequency for this case was 14 kHz. It should also be noted the input voltage could have been pushed even further than 36 kVpp for the aerogel sample but was not for fear of damaging the material.

An added benefit of the aerogel is its low density, a parameter that would be critical when applying these actuators to, for example, medium to small/micro air vehicles.

Example 4

Figure 10A:
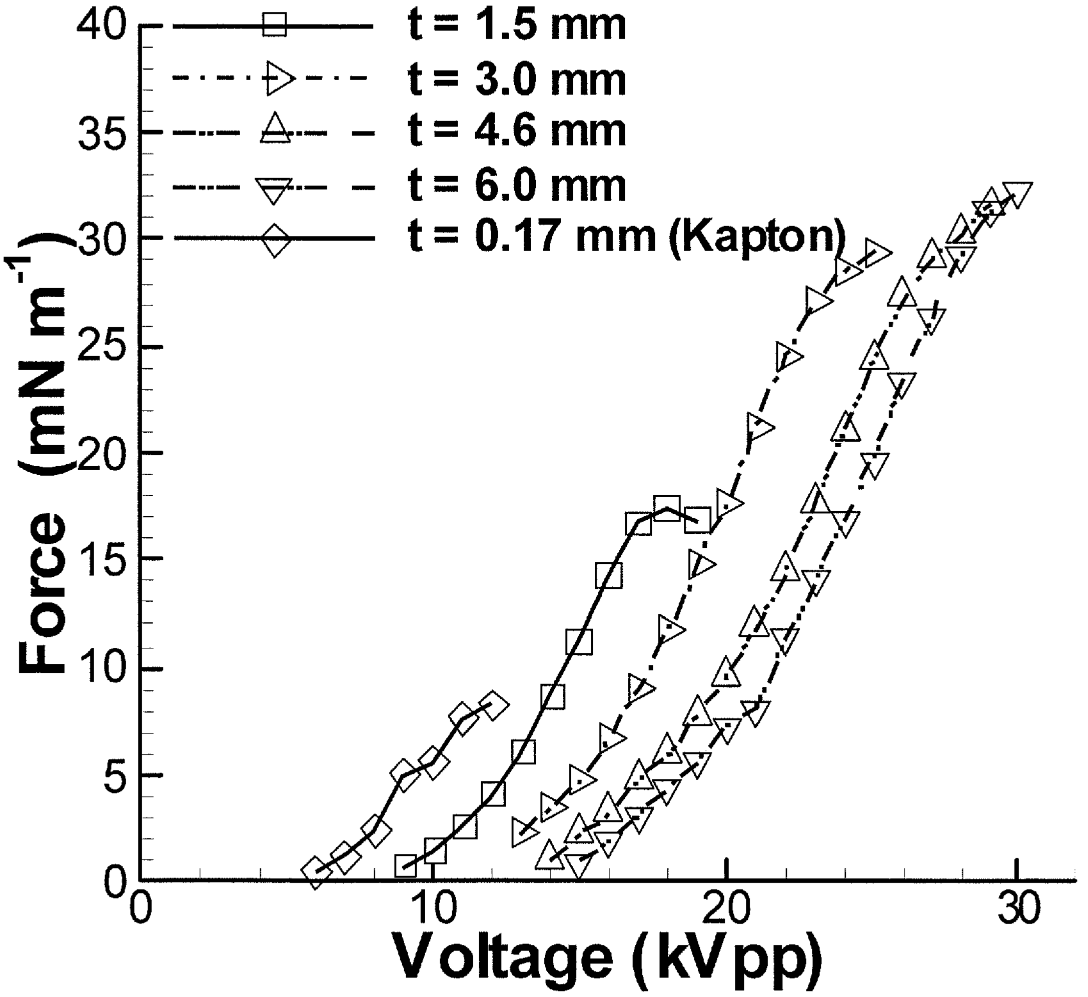
FIGS. 10A and 10B show plots of (A) force and (B) force/weight as a function of applied voltage for plasma actuators according to embodiments of the present invention.
Figure 10B:
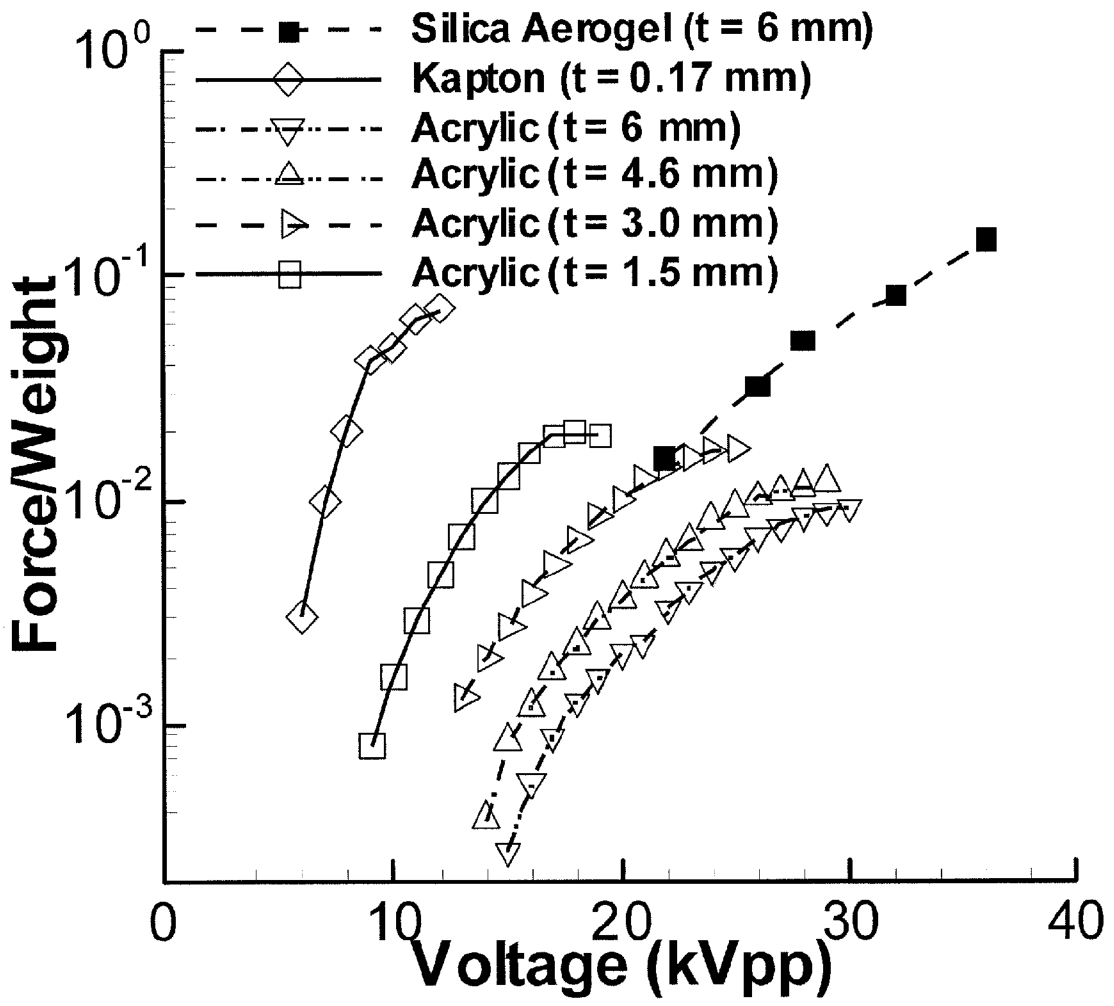

FIGS. 10A and 10B show plots of force vs. voltage for plasma actuators having varying thickness of the dielectric material (and different dielectric materials). Referring to FIG. 10A, increasing the thickness of the dielectric layer allows larger voltages to be applied to the actuator. The additional voltage in turn increases the maximum thrust achieved. The data shown in FIG. 10A for varying thicknesses is for an actuator using an acrylic dielectric material, as well as a single data set for a 170 μm-thick Kapton ($\in$=3.5) dielectric actuator. A constant driving frequency of 14 kHz was used.

A caveat however of increasing the dielectrics thickness is that the weight of the actuator also increases. Although this would be of little consequence for large scale applications, it could prove detrimental for medium to small/micro air vehicles wanting to benefit from the increased body force associated thicker dielectrics. FIG. 10B re-plots the data shown in FIG. 10A on a thrust-to-actuator-weight ratio as a function of voltage. The thrust-to-weight ratio divides the force produced by the density of dielectric times its volumetric footprint (referring to FIG. 5). The density of acrylic and Kapton were taken as 1.2 and 1.42 g $cm^{-3}$, respectively. FIG. 10B also includes a data set for an actuator with a 6 mm-thick silica aerogel dielectric material.

For the typical dielectrics tested (Kapton and acrylic), a thinner dielectric is clearly beneficial based on a force-to-weight basis. However, when the silica aerogel is considered ($\rho$=0.06 g $cm^{-3}$), the benefits of this extremely low density material are clearly shown in FIG. 10B. For a constant material thickness (t=6 mm), the thrust-to-weight ratio measured has increased from 0.009 (at 30 kVpp) to 0.143 (at 36 kVpp) for the acrylic and aerogel samples, respectively. The force-to-weight ratio For Kapton was measured to be 0.070 at 12 kVpp.

EMBODIMENTS

Embodiment 1

A plasma actuator, comprising:

a dielectric material;

at least one powered electrode in contact with the dielectric material; and at least one grounded electrode in contact with the dielectric material, wherein the at least one powered electrode and the at least one grounded electrode are electrically separated from each other by the dielectric material, and wherein the dielectric material is a ferroelectric material or a silica aerogel.

Embodiment 2

The plasma actuator according to embodiment 1, wherein the dielectric material is a ferroelectric material.

Embodiment 3

A solid state flow control device, comprising the plasma actuator according to embodiment 2.

Embodiment 4

A solid state heating source, comprising the plasma actuator according to embodiment 2.

Embodiment 5

The plasma actuator according to embodiment 2, wherein the at least one powered electrode is configured to connect to a power source.

Embodiment 6

The plasma actuator according to embodiment 2, further comprising a power source, wherein the at least one powered electrode is connected to the power source.

Embodiment 7

The plasma actuator according to embodiment 2, wherein a thickness of the dielectric material is in a range of from 0.1 mm to 10 mm.

Embodiment 8

The plasma actuator according to embodiment 2, wherein the at least one grounded electrode is encapsulated, and wherein the at least one powered electrode is exposed.

Embodiment 9

The plasma actuator according to embodiment 1, wherein the dielectric material is a silica aerogel.

Embodiment 10

A solid state flow control device, comprising the plasma actuator according to embodiment 9.

Embodiment 11

A solid state heating source, comprising the plasma actuator according to embodiment 9.

Embodiment 12

The plasma actuator according to embodiment 9, wherein the at least one powered electrode is configured to connect to a power source.

Embodiment 13

The plasma actuator according to embodiment 9, further comprising a power source, wherein the at least one powered electrode is connected to the power source.

Embodiment 14

The plasma actuator according to embodiment 9, wherein a thickness of the dielectric material is in a range of from 0.1 mm to 10 mm.

Embodiment 15

The plasma actuator according to embodiment 9, wherein the at least one grounded electrode is encapsulated, and wherein the at least one powered electrode is exposed.

Embodiment 16

A method of generating heat, comprising:

providing a plasma actuator, comprising:

- a dielectric material
- at least one powered electrode in contact with the dielectric material; and
- at least one grounded electrode in contact with the dielectric material,
- wherein the at least one powered electrode and the at least one grounded electrode are electrically separated from each other by the dielectric material, and
- wherein the dielectric material is a ferroelectric material or a silica aerogel;

and applying a voltage potential, with respect to the at least one grounded electrode, to the at least one powered electrode.

Embodiment 17

The method according to embodiment 16, wherein the dielectric material is a ferroelectric material.

Embodiment 18

The method according to embodiment 17, wherein the at least one powered electrode is configured to connect to a power source.

Embodiment 19

The method according to embodiment 17, further comprising a power source, wherein the at least one powered electrode is connected to the power source.

Embodiment 20

The method according to embodiment 17, wherein a thickness of the dielectric material is in a range of from 0.1 mm to 10 mm.

Embodiment 21

The method according to embodiment 17, wherein the at least one grounded electrode is encapsulated, and wherein the at least one powered electrode is exposed.

Embodiment 22

The method according to embodiment 17, wherein applying the voltage potential comprises applying the voltage potential in a duty cycle such that in each cycle of the duty cycle the voltage potential is applied for one or more portions of the cycle and not applied for the other portions of the cycle.

Embodiment 23

The method according to embodiment 22, wherein applying the voltage potential comprises applying the voltage potential at a frequency in a range of from 0.1 MHz to 10 MHz.

Embodiment 24

The method according to embodiment 17, wherein applying the voltage potential comprises applying the voltage potential at a frequency in a range of from 0.1 MHz to 10 MHz.

Embodiment 25

The method according to embodiment 16, wherein the dielectric material is a silica aerogel.

Embodiment 26

The method according to embodiment 25, wherein the at least one powered electrode is configured to connect to a power source.

Embodiment 27

The method according to embodiment 25, further comprising a power source, wherein the at least one powered electrode is connected to the power source.

Embodiment 28

The method according to embodiment 25, wherein a thickness of the dielectric material is in a range of from 0.1 mm to 10 mm.

Embodiment 29

The method according to embodiment 25, wherein the at least one grounded electrode is encapsulated, and wherein the at least one powered electrode is exposed.

Embodiment 30

The method according to embodiment 25, wherein applying the voltage potential comprises applying the voltage potential in a duty cycle such that in each cycle of the duty cycle the voltage potential is applied for one or more portions of the cycle and not applied for the other portions of the cycle.

Embodiment 31

The method according to embodiment 30, wherein applying the voltage potential comprises applying the voltage potential at a frequency in a range of from 0.1 MHz to 10 MHz.

Embodiment 32

The method according to embodiment 25, wherein applying the voltage potential comprises applying the voltage potential at a frequency in a range of from 0.1 MHz to 10 MHz.

Embodiment 33

A method of fabricating a plasma actuator, comprising:
- forming at least one ground electrode;
- forming a dielectric material; and
- forming at least one power electrode,
- wherein the at least one ground electrode is in contact with the dielectric material,
- wherein the at least one power electrode is in contact with the dielectric material,
- wherein the at least one ground and the at least one power electrode are electrically separated from each other by the dielectric material, and
- wherein the dielectric material is a ferroelectric material or a silica aerogel.

Embodiment 34

The method according to embodiment 33, wherein the dielectric material is a ferroelectric material.

Embodiment 35

The method according to embodiment 34, wherein the at least one power electrode is configured to connect to a power source.

Embodiment 36

The method according to embodiment 34, further comprising a power source, wherein the at least one power electrode is connected to the power source.

Embodiment 37

The method according to embodiment 34, wherein a thickness of the dielectric material is in a range of from 0.1 mm to 10 mm.

Embodiment 38

The method according to embodiment 34, wherein the at least one ground electrode is encapsulated, and wherein the at least one power electrode is exposed.

Embodiment 39

The method according to embodiment 33, wherein the dielectric material is a silica aerogel.

Embodiment 40

The method according to embodiment 39, wherein the at least one power electrode is configured to connect to a power source.

Embodiment 41

The method according to embodiment 39, further comprising a power source, wherein the at least one power electrode is connected to the power source.

Embodiment 42

The method according to embodiment 39, wherein a thickness of the dielectric material is in a range of from 0.1 mm to 10 mm.

Embodiment 43

The method according to embodiment 39, wherein the at least one ground electrode is encapsulated, and wherein the at least one power electrode is exposed.

All patents, patent applications, provisional applications, and publications referred to or cited herein, and/or listed in the References section, are incorporated by reference in their entirety, including all figures and tables, to the extent they are not inconsistent with the explicit teachings of this specification.

It should be understood that the examples and embodiments described herein arc for illustrative purposes only and that various modifications or changes in light thereof will be suggested to persons skilled in the art and are to be included within the spirit and purview of this application.

REFERENCES

[1] Roth, J. R, Sherman, D., and Wilkinson, S. "Boundary layer flow control with one atmosphere uniform glow discharge surface plasma," 36$^{th}$ AIAA Aerospace Science Meeting, AIAA Paper 1998-0328, Reno, Nev., 1998.

[2] Roth, J. R., Sherman, D. M., and Wilkinson, S. P., "Electrohydrodynamic flow control with a glow-discharge surface plasma," *AIAA J.* Vol 38, 2000, pp. 1166-72.

[3] He, C., Corke, T., and Patel, M., "Plasma flaps and Slats: An Application of Weakly Ionized Plasma Actuators," *J. of Aircraft* Vol. 46, No. 3, 2009, pp. 864-73.

[4] Benard, N., Braud P., Jolibois, J., Moreau, E., "Airflow Reattachment Along a NACA 0015 Airfoil by Surfaces Dielectric Barrier Discharge Actuator—Time Resolved Particle Image Velocimetry Investigation," *4th Flow Control Conference*, AIAA 2008-4202 Seattle, Wash., June 2008.

[5]Visbal, M. R., Gaitonde, D. V., Roy, S., "Control of Transitional and Turbulent Flows Using Plasma-Based Actuators," *AIAA Fluid Dynamics Conference and Exhibit*, AIAA Paper 2006-3230, San Francisco, Calif., June, 2006.

[6]Post, M. and Corke, T., "Separation Control Using Plasma Actuators: Dynamic Stall Vortex Control on Oscillating Airfoil," *AIAA J.*, Vol. 44, No. 12, 2006, pp. 3125-35.

[7]Thomas, F. O., Kozlov, A., and Corke, T. C., "Plasma Actuators for Landing Gear Noise Reduction" *11th AIAA/CEAS Aeroacoustics Conference* (*26th AIAA Aeroacoustics Conference*), AIAA Paper 2005-3010, Monterey, Calif., May, 2005.

[8]Huang, J., Corke, T. C., and Thomas, F. O., "Plasma Actuators for Separation Control of Low-Pressure Turbine Blades," *AIAA Journal*, Vol. 44, No. 1, 2006, pp 51-57.

[9]Rizzetta, D. P. and Visbal, M. R, "Plasma-Based Flow-Control Strategies for Transitional Highly Loaded Low-Pressure Turbines," *J. Fluids Eng.*, Vol. 130, Issue 4, 2008.

[10]Sung, Y., Kim, W., Mungal, M. G., and Cappeli, M., "Aerodynamic Modification of Flow over Bluff Objects by Plasma Actuation," Experiments in Fluids, Vol. 41, No. 3, September 2006, pp. 479-486.

[11]Moreau, E., "Airflow control by non-thermal plasma actuators," *J. Phys. D: Applied Physics*, Vol. 40, 2007, pp. 605-636.

[12]Abe, T., Takizawa, Y., Sato, S., and Kimura, N., "A Parametric Experimental Study for Momentum Transfer by Plasma Actuator." *45th AIAA Aerospace Sciences Meeting and Exhibit,* AIAA Paper 2007-187, Reno, Nev., January, 2007.

[13]Roth, J. R. and Dai, X., "Optimization of the Aerodynamic Plasma Actuator as an Electrohydrodynamic (EHD) Electrical Device," *44th AIAA Aerospace Sciences Meeting and Exhibit,* AIAA Paper 2006-1203, Reno, Nev., January, 2006.

[14]Enloe, C. L., McLaughlin, T. E., VanDyken, R. D., Kachner, K. D., Jumper, E. J., and Corke T. C., "Mechanisms and Responses of a Single Dielectric Barrier Plasma Actuator: Plasma Morphology," *AIAA Journal*, Vol. 42, No. 3, 2004, pp 589-594.

[15]Enloe, C. L., McLaughlin, T. E., VanDyken, R. D., Kachner, K. D., Jumper, E. J., Corke, T. C., Post, M., and Haddad, O., "Mechanisms and Responses of a Single Dielectric Barrier Plasma Actuator: Geometric Effects," *AIAA Journal*, Vol. 42, No. 3, 2004, pp 595-604.

[16]Forte, M., Jolibois, J., Pons, J., Moreau, E., Touchard, G., Cazalens, M., "Optimization of a dielectric barrier discharge actuator by stationary and non-stationary measurements of the induced flow velocity: application to flow control," *Exp Fluids*, Vol. 43, 2007, pp 917-928.

[17]Hoskinson, A. R., Hershkowitz, N., and Ashpis, D. E., "Force measurements of single and double barrier DBD plasma actuators in quiescent air," *J. Phys. D: Applied Physics*, Vol. 41, 2008.

[18]Opaits, D. F., Zaidi, S. H., Shneider, M. N., Miles, R. B., Likhanskii, A. V., Macheret, S. O., and Ashpis, D., "Improving Thrust by Suppressing Charge Build-up in Pulsed DBD Plasma Actuators," *47th AIAA Aerospace Sciences Meeting Including The New Horizons Forum and Aerospace Exposition*, AIAA Paper 2009-487, Orlando, Fla., January, 2009.

[19]Thomas, F. O., Corke, T. C., Iqbal, M., Kozlov, A., and Schatzman, D., "Optimization of Dielectric Barrier Discharge Plasma Actuators for Active Aerodynamic Flow Control," *AIAA Journal*, Vol. 47, No. 9, 2009, pp 2169-2177.

[20]Model 9302 Atomizer, Instruction Manual, TSI, September, 2000.

[21]DaVis 7.2, Instruction Manual, LaVision GmbH, December, 2007.

[22]Baughn, J. W., Porter, C. O., Peterson, B. L., McLaughlin, T. E., Enloe, C. L., Font, G. I. and Baird, C., "Momentum transfer for an aerodynamic plasma actuator with an imposed boundary layer," *Proc. 44th AIAA Aerospace Sciences Meeting*, AIAA Paper 2006-168, Reno, Nev., January 2006.

[23]Enloe, C. L., McLaughlin, T. E., and Font, G. I., "Parameterization of temporal structure in the single-dielectric-barrier aerodynamic plasma actuator," *AIAA Journal*, Vol. 44, No. 6, 2006, pp 1127-1136.

[24]Hrubesh, L. W., Keene, L. E., and Latorre, V. R., "Dielectric properties of aerogels", *Journal of Materials Research*, Vol. 8, 1993, pp 1763-41.

What is claimed is:

1. A plasma actuator, comprising:

a dielectric material;

at least one powered electrode in contact with the dielectric material; and at least one grounded electrode in contact with the dielectric material, wherein the at least one powered electrode and the at least one grounded electrode are electrically separated from each other by the dielectric material, wherein the dielectric material is a ferroelectric material or a silica aerogel, wherein the at least one grounded electrode is encapsulated, and wherein the at least one powered electrode is exposed.

2. The plasma actuator according to claim 1, wherein the dielectric material is a ferroelectric material.

3. A solid state flow control device, comprising the plasma actuator according to claim 2.

4. A solid state heating source, comprising the plasma actuator according to claim 2.

5. The plasma actuator according to claim 2, further comprising a power source, wherein the at least one powered electrode is connected to the power source.

6. The plasma actuator according to claim 2, wherein a thickness of the dielectric material is in a range of from 0.1 mm to 10 mm.

7. The plasma actuator according to claim 1, wherein the at least one powered electrode is configured to connect to a power source.

8. The plasma actuator according to claim 1, wherein the dielectric material is a silica aerogel.

9. A solid state flow control device, comprising the plasma actuator according to claim 8.

10. A solid state heating source, comprising the plasma actuator according to claim 8.

11. The plasma actuator according to claim 8, further comprising a power source, wherein the at least one powered electrode is connected to the power source.

12. The plasma actuator according to claim 8, wherein a thickness of the dielectric material is in a range of from 0.1 mm to 10 mm.

13. The plasma actuator according to claim 1, wherein the at least one ground electrode is encapsulated by at least one of the following: the dielectric material; a separate dielectric material; an epoxy material; and electrical tape.

14. A method of generating heat, comprising:

providing a plasma actuator, comprising:

a dielectric material at least one powered electrode in contact with the dielectric material; and at least one grounded electrode in contact with the dielectric material, wherein the at least one powered electrode and the at least one grounded electrode are electrically separated from each other by the dielectric material, wherein the dielectric material is a ferroelectric material or a silica aerogel, wherein the at least one grounded electrode is encapsulated, and wherein the at least one powered electrode is exposed; and applying a voltage potential, with respect to the at least one grounded electrode, to the at least one powered electrode.

15. The method according to claim 14, wherein the dielectric material is a ferroelectric material.

16. The method according to claim 14, wherein the dielectric material is a silica aerogel.

17. The method according to claim 14, wherein the at least one ground electrode is encapsulated by at least one of the following: the dielectric material; a separate dielectric material; an epoxy material; and electrical tape.

18. A method of fabricating a plasma actuator, comprising:

forming at least one ground electrode;

forming a dielectric material; and forming at least one power electrode, wherein the at least one ground electrode is in contact with the dielectric material, wherein the at least one power electrode is in contact with the dielectric material, wherein the at least one ground and the at least one power electrode are electrically separated from each other by the dielectric material, wherein the dielectric material is a ferroelectric material or a silica aerogel, wherein the at least one grounded electrode is encapsulated, and wherein the at least one powered electrode is exposed.

19. The method according to claim 18, wherein the dielectric material is a ferroelectric material.

20. The method according to claim 18, wherein the dielectric material is a silica aerogel.

21. The method according to claim 18, wherein the at least one ground electrode is encapsulated by at least one of the following: the dielectric material; a separate dielectric material; an epoxy material; and electrical tape.

* * * * *